(12) United States Patent
Bae

(10) Patent No.: US 11,632,001 B2
(45) Date of Patent: Apr. 18, 2023

(54) WIRELESS POWER CONTROL METHOD AND APPARATUS

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/285,726

(22) PCT Filed: Aug. 21, 2019

(86) PCT No.: PCT/KR2019/010616
§ 371 (c)(1),
(2) Date: Apr. 15, 2021

(87) PCT Pub. No.: WO2020/085630
PCT Pub. Date: Apr. 30, 2020

(65) Prior Publication Data
US 2022/0006328 A1 Jan. 6, 2022

(30) Foreign Application Priority Data

Oct. 22, 2018 (KR) .................. 10-2018-0125875

(51) Int. Cl.
*H02J 50/00* (2016.01)
*H02J 50/40* (2016.01)
(Continued)

(52) U.S. Cl.
CPC ............ *H02J 50/402* (2020.01); *H02J 50/12* (2016.02); *H02J 50/80* (2016.02); *H02J 50/90* (2016.02); *H04B 5/0037* (2013.01)

(58) Field of Classification Search
CPC .......... H02J 50/00; H02J 50/40; H02J 50/402; H04B 5/00
See application file for complete search history.

(56) References Cited

U.S. PATENT DOCUMENTS 9,800,076 B2 * 10/2017 Jadidian .................. H02J 50/80
2010/0225173 A1 * 9/2010 Aoyama ............. H02J 7/00045
320/108

(Continued)

FOREIGN PATENT DOCUMENTS

KR   10-2016-0028365 A   3/2016
KR   10-2017-0069446 A   6/2017
(Continued)

*Primary Examiner* — Adi Amrany
(74) *Attorney, Agent, or Firm* — Birch, Stewart, Kolasch & Birch, LLP

(57) ABSTRACT

The present invention relates to a wireless power transmission method and apparatus therefor. A wireless power transmitter according to an embodiment may comprise: a plurality of transmission coils; an alternating current power generator for generating a plurality of alternating current power signals applied to the plurality of transmission coils; a power source for supplying direct current power to the alternating current power generator; and a controller for controlling the phases of the plurality of alternating current power signals, wherein the controller changes the phase of at least one of the plurality of alternating current power signals to control transmission power output through the plurality of transmission coils. Therefore, the present invention provides an advantage in that a wireless power transmitter including a plurality of transmission coils can more precisely control wireless power.

14 Claims, 10 Drawing Sheets

(51) Int. Cl.
*H02J 50/80* (2016.01)
*H02J 50/90* (2016.01)
*H02J 50/12* (2016.01)
*H04B 5/00* (2006.01)

(56) References Cited

U.S. PATENT DOCUMENTS

| | | | | |
|---|---|---|---|---|
| 2013/0033118 A1* | 2/2013 | Karalis | ............ | H02J 50/70 |
| | | | | 307/104 |
| 2015/0236513 A1* | 8/2015 | Covic | ............ | H02J 50/70 |
| | | | | 307/104 |
| 2015/0236526 A1* | 8/2015 | Jadidian | ............ | H02J 5/005 |
| | | | | 320/108 |
| 2015/0326035 A1* | 11/2015 | Murayama | ............ | H02J 7/0016 |
| | | | | 307/104 |
| 2015/0333797 A1* | 11/2015 | Nejatali | ............ | H02J 50/12 |
| | | | | 375/376 |
| 2016/0204620 A1* | 7/2016 | Cho | ............ | H02J 7/0042 |
| | | | | 307/104 |
| 2016/0329752 A1* | 11/2016 | Bae | ............ | H04B 5/0075 |
| 2017/0018936 A1* | 1/2017 | Muratov | ............ | H04B 5/0037 |
| 2017/0117756 A1* | 4/2017 | Muratov | ............ | H02J 50/60 |
| 2017/0358950 A1* | 12/2017 | Zeine | ............ | H04B 5/0037 |
| 2018/0019624 A1* | 1/2018 | Chen | ............ | H04B 5/0037 |
| 2018/0236879 A1* | 8/2018 | Elshaer | ............ | H02J 50/12 |
| 2018/0294672 A1* | 10/2018 | Zhong | ............ | H01F 38/14 |
| 2019/0067978 A1* | 2/2019 | Liu | ............ | H02J 7/025 |
| 2019/0260232 A1* | 8/2019 | Liu | ............ | H02M 3/158 |
| 2019/0305601 A1* | 10/2019 | Cimaz | ............ | H04B 5/0037 |
| 2020/0196398 A1* | 6/2020 | Ok | ............ | H05B 6/065 |
| 2020/0244108 A1* | 7/2020 | Kim | ............ | H02J 50/60 |

FOREIGN PATENT DOCUMENTS

| | | |
|---|---|---|
| KR | 10-1897402 B1 | 9/2018 |
| KR | 10-2018-0107012 A | 10/2018 |
| WO | WO 2016/108949 A1 | 7/2016 |
| WO | WO 2016/126167 A1 | 8/2016 |

* cited by examiner ial Application No. PCT/KR2019/010616, filed on Aug. 21, 2019, which claims priority under 35 U.S.C. 119(a) to Patent Application No. 10-2018-0125875, filed in the Republic of Korea on Oct. 22, 2018, all of which are hereby expressly incorporated by reference into the present application.

WIRELESS POWER CONTROL METHOD AND APPARATUS

CROSS REFERENCE TO RELATED APPLICATIONS

This application is the National Phase of PCT International Application No. PCT/KR2019/010616, filed on Aug. 21, 2019, which claims priority under 35 U.S.C. 119(a) to Patent Application No. 10-2018-0125875, filed in the Republic of Korea on Oct. 22, 2018, all of which are hereby expressly incorporated by reference into the present application.

TECHNICAL FIELD

Embodiments relate to wireless power transmission technology, and more particularly to a wireless power control method and an apparatus therefor in a wireless power transmission device including a plurality of transmission coils.

BACKGROUND ART

Recently, with the rapid development of information and communication technology, a society based on ubiquitous information and communication technology has been formed.

In order to connect information and communication apparatuses anywhere and anytime, sensors each having a computer chip having a communication function need to be installed in all social facilities. Accordingly, problems related to supply of power to such apparatuses or sensors have newly arisen.

In addition, as the number of portable devices such as tablet PCs and MP3 players as well as smartphones rapidly increases, the task of charging batteries of portable devices requires time and effort from users. As a way to solve this problem, wireless power transmission technology has recently attracted attention.

Wireless power transmission or wireless energy transfer technology refers to technology of wirelessly transmitting electric energy from a transmitter to a receiver using the principle of magnetic induction. In the 1800s, electrical motors or transformers using the principle of electromagnetic induction already started to be used and then methods of radiating radio waves or electromagnetic waves such as lasers and transmitting electric energy were also attempted. Commonly used electric toothbrushes or electric razors are charged using the principle of electromagnetic induction.

As products to which a wireless charging function is applied are diversified, a wider range of power control is required.

Conventionally, in order to control power transmitted through a transmission coil of a wireless power transmitter, the intensity of a driving voltage applied to an inverter, a frequency within an operation frequency band, and a duty of a pulse width modulation signal are controlled.

However, when a conventional wireless power control method is applied to a wireless power transmission apparatus including a plurality of transmission coils, power control for each transmission circuit is performed, resulting in high complexity and degraded power control precision.

SUMMARY

Embodiments provide a wireless power control method of a wireless power transmission apparatus including a plurality of transmission coils and an apparatus therefor.

Embodiments provide a wireless power control method of a wireless power transmission apparatus for precisely controlling total transmission power of a wireless power transmitter through phase control of output of an amplifier corresponding to each transmission coil by a wireless power transmitter including a plurality of transmission coils.

The technical problems solved by the embodiments are not limited to the above technical problems and other technical problems which are not described herein will become apparent to those skilled in the art from the following description.

Embodiments provide a wireless power transmission method and apparatuses therefor.

According to an embodiment, a wireless power transmitter includes a plurality of transmission coils, an alternating current (AC) power generator configured to generate a plurality of Ac power signals applied to the plurality of transmission coils, a power supply configured to supply direct current (DC) power to the AC power generator, and a controller configured to control phases of the plurality of AC power signals, wherein the controller controls transmission power output through the plurality of transmission coils by varying a phase of at least one among the plurality of AC power signals.

The controller may control the transmission power by fixing phases of at least two AC power signals among the plurality of AC power signals and varying phases of at least two different AC power signals among the plurality of AC power signals.

The AC power generator may include a plurality of inverters corresponding to a number of the plurality of transmission coils and driving voltages applied to the plurality of inverters are equal to each other.

The controller may generate a plurality of pulse width modulation signals for controlling a plurality of switches included in the inverter, and the inverter may generate an AC power signal based on the driving voltage and the plurality of pulse width modulation signals.

The controller may control a duty rate of the pulse width modulation signal to maintain the plurality of AC power signals in a duty of 50% or greater.

The controller may fix an operation frequency by controlling a frequency of the pulse width modulation signal.

The AC power generator may include a plurality of phase control circuits configured to control phases of the plurality of AC power signals, respectively, and the controller may control the transmission power by controlling the plurality of phase control circuits.

The wireless power transmitter may further include a demodulator configured to demodulate a control signal of a wireless power receiver, and the controller may control the plurality of phase control circuits by determining the transmission power based on required power of the wireless power receiver, received from the demodulator, and generating a plurality of phase control signals corresponding to the determined transmission power.

According to another embodiment, a wireless power control method of a wireless power transmitter includes identifying a wireless power receiver, receiving information on required power from the identified wireless power receiver, determining transmission power to be transmitted through a plurality of included transmission coils based on the required power, determining a phase of an alternating current (AC) power signal applied to the plurality of transmission coils based on the determined total transmission power, and controlling a phase of an AC power signal applied to a corresponding transmission coil depending on the determined phase.

The transmission power may be controlled by fixing phases of at least two AC power signals among the plurality of AC power signals and varying phases of at least two different AC power signals among the plurality of AC power signals.

The wireless power transmitter may include a plurality of inverters corresponding to a number of the plurality of transmission coils, and driving voltages applied to the plurality of inverters may be equal to each other.

The AC power signal may be generated based on the driving voltage and a plurality of pulse width modulation signals for controlling a plurality of switches included in the inverter.

A duty rate of the pulse width modulation signal may be controlled to maintain the plurality of AC power signals in a duty of 50% or greater.

An operation frequency may be fixed by controlling a frequency of the pulse width modulation signal.

The wireless power transmitter may include a plurality of phase control circuits configured to control phases of the plurality of AC power signals, and the transmission power may be controlled by controlling the plurality of phase control circuits depending on the determined phase.

Advantageous Effects

A method, an apparatus, and a system according to an embodiment may have the following effects.

Embodiments provide a wireless power control method of a wireless power transmission apparatus including multi coils and an apparatus therefor.

Embodiments provide a wireless power transmission apparatus for precisely controlling total transmission power by controlling an output signal phase of an amplifier corresponding to each transmission coil in a wireless power transmission apparatus including a plurality of transmission coils.

A wireless power transmission apparatus according to an embodiment may advantageously stably control power supply in a wide range depending on various types of a wireless power reception apparatus and power required by a wireless power receiver.

A wireless power transmission apparatus according to an embodiment may advantageously precisely control total transmission power through one controller, thereby lowering device complexity and reducing manufacturing costs.

It will be appreciated by persons skilled in the art that that the effects that could be achieved with the present disclosure are not limited to what has been particularly described hereinabove and other advantages of the present disclosure will be more clearly understood from the detailed description.

DETAILED DESCRIPTION OF THE EMBODIMENTS

Figure 1:
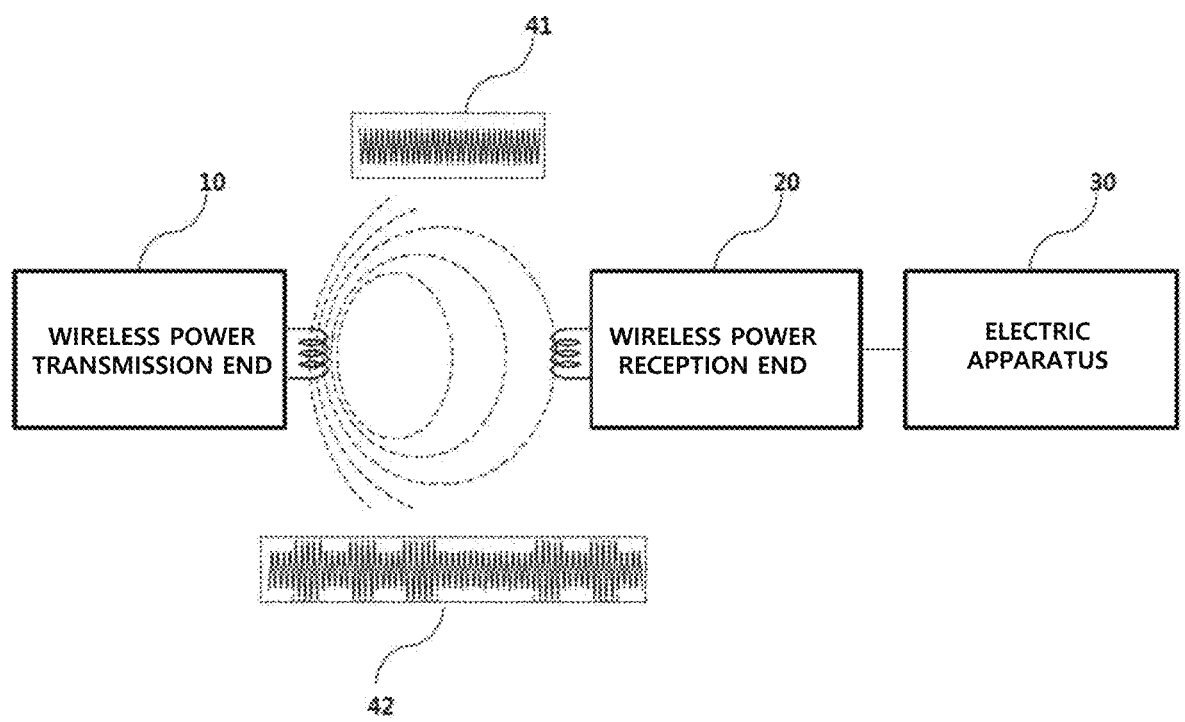
FIG. 1 is a block diagram for explanation of a wireless charging system according to an embodiment.

A wireless power transmitter according to an embodiment may include a plurality of transmission coils, an alternating current (AC) power generator configured to generate a plurality of Ac power signals applied to the plurality of transmission coils, a power supply configured to supply direct current (DC) power to the AC power generator, and a controller configured to control phases of the plurality of AC power signals, wherein the controller controls transmission power output through the plurality of transmission coils by varying a phase of at least one among the plurality of AC power signals.

Reference will now be made in detail to exemplary embodiments, examples of which are illustrated in the accompanying drawings. The suffixes "module" and "unit" of elements herein are used for convenience of description and thus may be used interchangeably and do not have any distinguishable meanings or functions.

In description of exemplary embodiments, the suffixes "module" and "unit" of elements herein are embodied as a hardware element, for example, a circuit device, a microprocessor, a memory, and a sensor, but this is merely an embodiment and a partial or entire function of the corresponding element may be embodied in the form of software.

In description of exemplary embodiments, it will be understood that, when an element is referred to as being "on" or "under" another element, the element can be directly on another element or intervening elements may be present. In addition, when an element is referred to as being "on" or "under" another element, this may include the meaning of an upward direction or a downward direction based on one component.

In the following description of the embodiments, for convenience of description, an apparatus for wirelessly transmitting power in a wireless power transmission system may be used interchangeably with a wireless power transmitter, a wireless power transmission apparatus, a transmission end, a transmitter, a transmission apparatus, a transmission side, etc. In addition, for convenience of description, an apparatus having a function of wirelessly receiving power from a wireless power transmission apparatus may be used interchangeably with a wireless power reception apparatus, a wireless power receiver, a reception terminal, a reception side, a reception apparatus, a receiver, etc.

A transmitter according to embodiments may be configured in the form of a pad, a cradle, an access point (AP), a small base station, a stand, a ceiling insert type, a wall-hanging type, or the like, and one transmitter may simultaneously transmit power to a plurality of wireless power reception apparatuses. To this end, a transmitter may include at least one wireless power transmission element.

Here, a wireless power transmission element may use various wireless power transmission standards based on an electromagnetic induction method of charging according to the electromagnetic induction principle that a magnetic field is generated from a coil of a power transmission end and electricity is induced from a coil of a reception end under the influence of the magnetic field. For example, the wireless power transmission standard may include, but is not limited to, standard technology of an electromagnetic induction method defined in wireless power consortium (WPC) Qi and power matters alliance (PMA).

In addition, a wireless power receiver according to an embodiment may include at least one wireless power reception element and may wirelessly receive power from one or more transmitters.

In addition, a receiver according to embodiments may be mounted on a small-size electronic apparatus such as a mobile phone, a smartphone, a laptop, a digital broadcasting terminal, a personal digital assistants (PDA), a portable multimedia player (PMP), a navigation system, an MP3 player, an electric toothbrush, a radio frequency identification (RFID) tag, an illumination apparatus, a remote controller, a bobber, and a smart watch without being limited thereto. Accordingly, the receiver may be any device as long as the receiver includes the wireless power reception element according to embodiments to charge a battery.

FIG. 1 is a block diagram for explanation of a wireless charging system according to an embodiment.

Referring to FIG. 1, the wireless charging system may broadly include a wireless power transmission end 10 configured to wirelessly transmit power, a wireless power reception end 20 configured to receive the transmission power, and an electronic device 30 configured to receive the received power.

For example, the wireless power transmission end 10 and the wireless power reception end 20 may perform in-band communication of exchanging information using the same frequency band as an operation frequency used in wireless power transmission.

In the in-band communication, upon receiving a power signal 41 transmitted from the wireless power transmission end 10, the wireless power reception end 20 may modulate the received power signal and may transmit the modulated signal 42 to the wireless power transmission end 10.

In another example, the wireless power transmission end 10 and the wireless power reception end 20 may also perform out-of-band communication of exchanging information using separate frequency bands different from an operation frequency used in wireless power transmission.

For example, information exchanged between the wireless power transmission end 10 and the wireless power reception end 20 may include control information as well as state information of each other. Here, the state information and the control information that are exchanged between transmission and reception ends will be obviously understood with reference to a description of the following embodiments.

The in-band communication and the out-of-band communication may provide bi-directional communication without being limited thereto. According to another embodiment, unidirectional communication or half-duplex communication may also be provided.

For example, in the unidirectional communication, the wireless power reception end 20 may transmit information only to the wireless power transmission end 10 without being limited thereto, and the wireless power transmission end 10 may also transmit information only to the wireless power reception end 20.

In the half-duplex communication, bi-directional communication may be enabled between the wireless power reception end 20 and the wireless power transmission end 10, but it may be possible to transmit information by only one device at any one time point.

The wireless power reception end 20 according to an embodiment may acquire various pieces of state information of the electronic device 30.

For example, the state information of the electronic device 30 may include current power usage information, information for identifying executed application, CPU usage information, battery charging state information, battery output voltage/current information, and the like, without being limited thereto, and may include any information that is capable of being acquired from the electronic device 30 and being used in wireless power control.

The wireless power transmission end 10 according to an embodiment may transmit a predetermined packet indicating whether high-speed charging is supported, to the wireless power reception end 20. The wireless power reception end 20 may inform the electronic apparatus 30 that the wireless power transfer end 10 supports the fast charging mode, upon determining that the wireless power transfer end 10 supports the fast charging mode. The electronic apparatus 30 may display information indicating that fast charging is possible through a predetermined display means, for example, a liquid crystal display.

Figure 2:
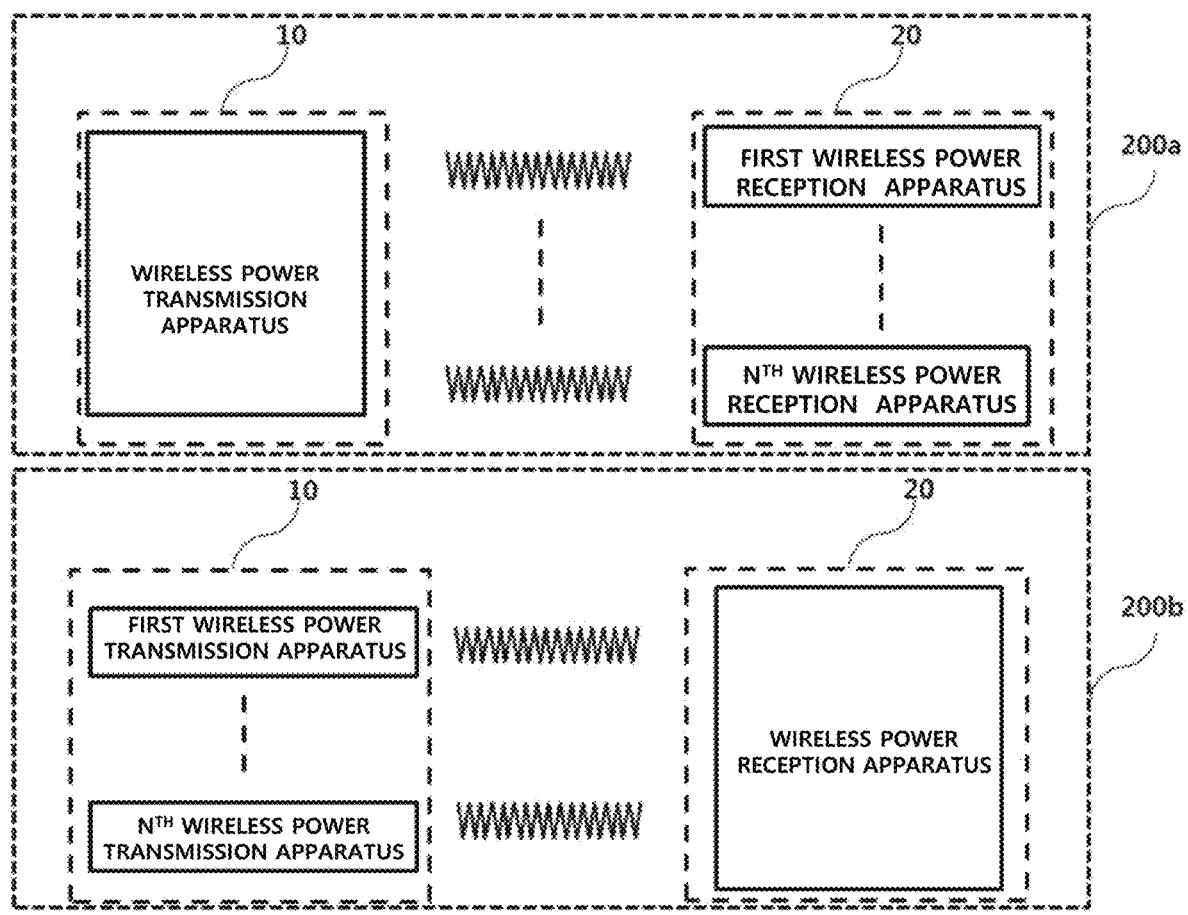
FIG. 2 is a block diagram for explanation of a wireless charging system according to another embodiment.

FIG. 2 is a block diagram for explanation of a wireless charging system according to another embodiment.

For example, as shown in a reference numeral 200a, the wireless power reception end 20 may include a plurality of wireless power reception apparatuses, and the plurality of wireless power reception apparatuses may be connected to one wireless power transmission end 10 to perform wireless charging.

In this case, the wireless power transmission end 10 may distribute and transmit power to the plurality of wireless power reception apparatuses using a time-division method without being limited thereto, and in another example, the wireless power transmission end 10 may distribute and transmit power to a plurality of wireless power reception apparatuses using different frequency bands allocated to respective wireless power reception apparatuses.

In this case, the number of wireless power reception apparatuses connectable to one wireless power transmission end 10 may be adaptively determined based on at least one of requested electric energy for respective wireless power reception apparatuses, a battery charging state, power consumption of an electronic device, or available electric energy of a wireless power transmission apparatus.

In another example, as shown in a reference numeral 200b, the wireless power transmission end 10 may include a plurality of wireless power transmission apparatuses.

In this case, the wireless power reception end 20 may be simultaneously be connected to the plurality of wireless power transmission apparatuses, and may simultaneously receive power from the connected wireless power transmission apparatuses to perform charging.

In this case, the number of wireless power transmission apparatuses connected to the wireless power reception end 20 may be adaptively determined based on requested electric energy of the wireless power reception end 20, a battery charging state, power consumption of an electronic device, available electric energy of a wireless power transmission device, and the like.

Figure 3:
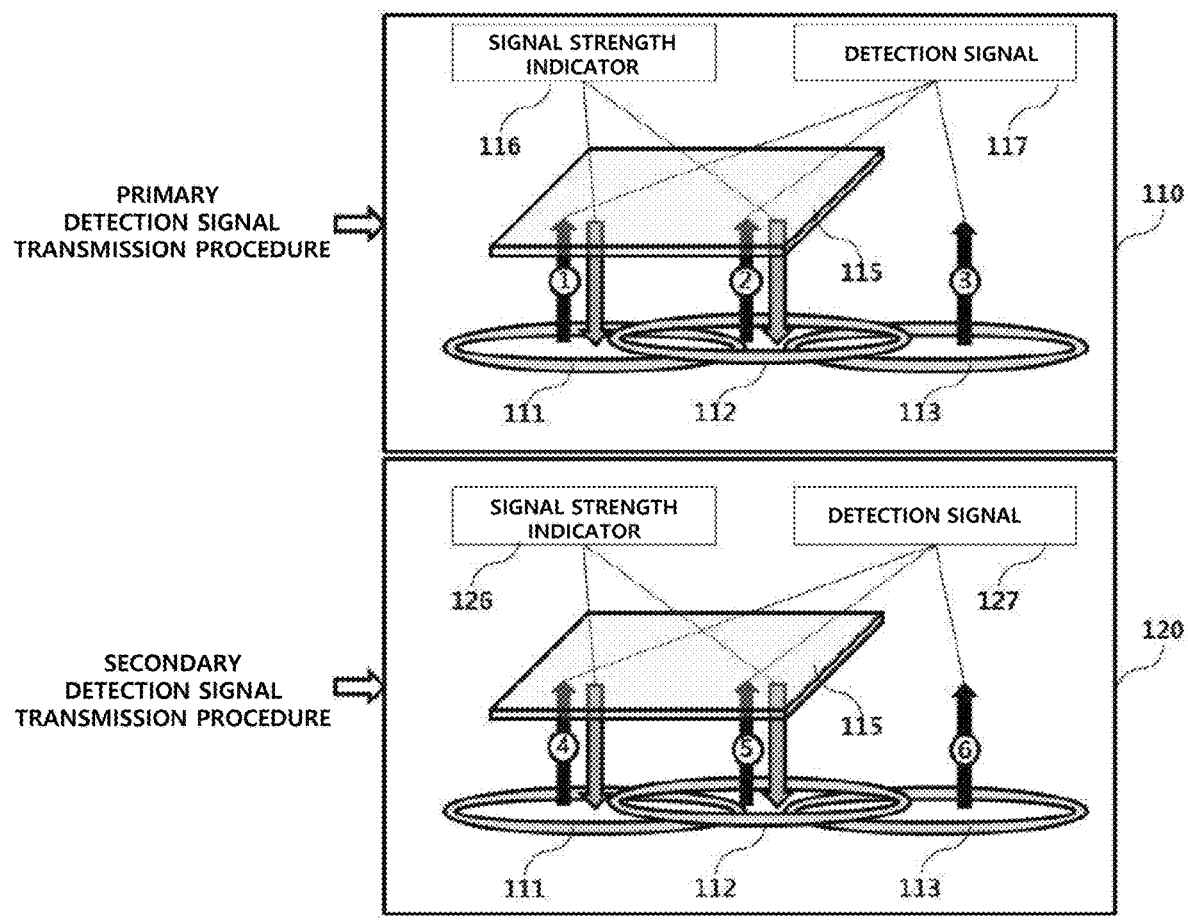
FIG. 3 is a diagram for explanation of a procedure of transmitting a detection signal in a wireless charging system according to an embodiment.

FIG. 3 is a diagram for explanation of a procedure of transmitting a detection signal in a wireless charging system according to an embodiment.

For example, three transmission coils 111, 112, and 113 may be installed in a wireless power transmitter. A partial region of each transmission coil may overlap another transmission coil, and a wireless power transmitter may sequentially transmit predetermined detection signals 117 and 127—for example, a digital ping signal—for detection of presence of a wireless power receiver through each transmission coil in a predefined order.

As shown in FIG. 3, the wireless power transmitter may sequentially transmit the detection signal 117 through a primary detection signal transmission procedure indicated by a reference numeral 110 and may identify the transmission coils 111 and 112 through which a signal strength indicator 116 is received from a wireless power receiver 115.

Then, the wireless power transmitter may sequentially transmit the detection signal 127 through a secondary detection signal transmission procedure indicated by a reference numeral 120, may identify a transmission coil with high power transmission efficiency (or transmission efficiency)—that is, an alignment state between a transmission coil and a reception coil—among the transmission coils 111 and 112 through which a signal strength indicator 126 is received, and may perform control to transmit power—that is, to perform wireless charging—through the identified transmission coil.

As shown in FIG. 3, the wireless power transmitter performs the detection signal transmission procedure twice in order to more accurately identify whether reception coils of the wireless power receiver are appropriately aligned in a transmission coil.

As shown in reference numerals 110 and 120 of FIG. 3, when a first transmission coil 111 and a second transmission coil 112 receive the signal strength indicators 116 and 126, the wireless power transmitter may select a transmission coil that is the most appropriately aligned based on the signal strength indicator 126 received by each of the first transmission coil 111 and the second transmission coil 112 and may perform wireless charging using the selected transmission coil.

Figure 4:
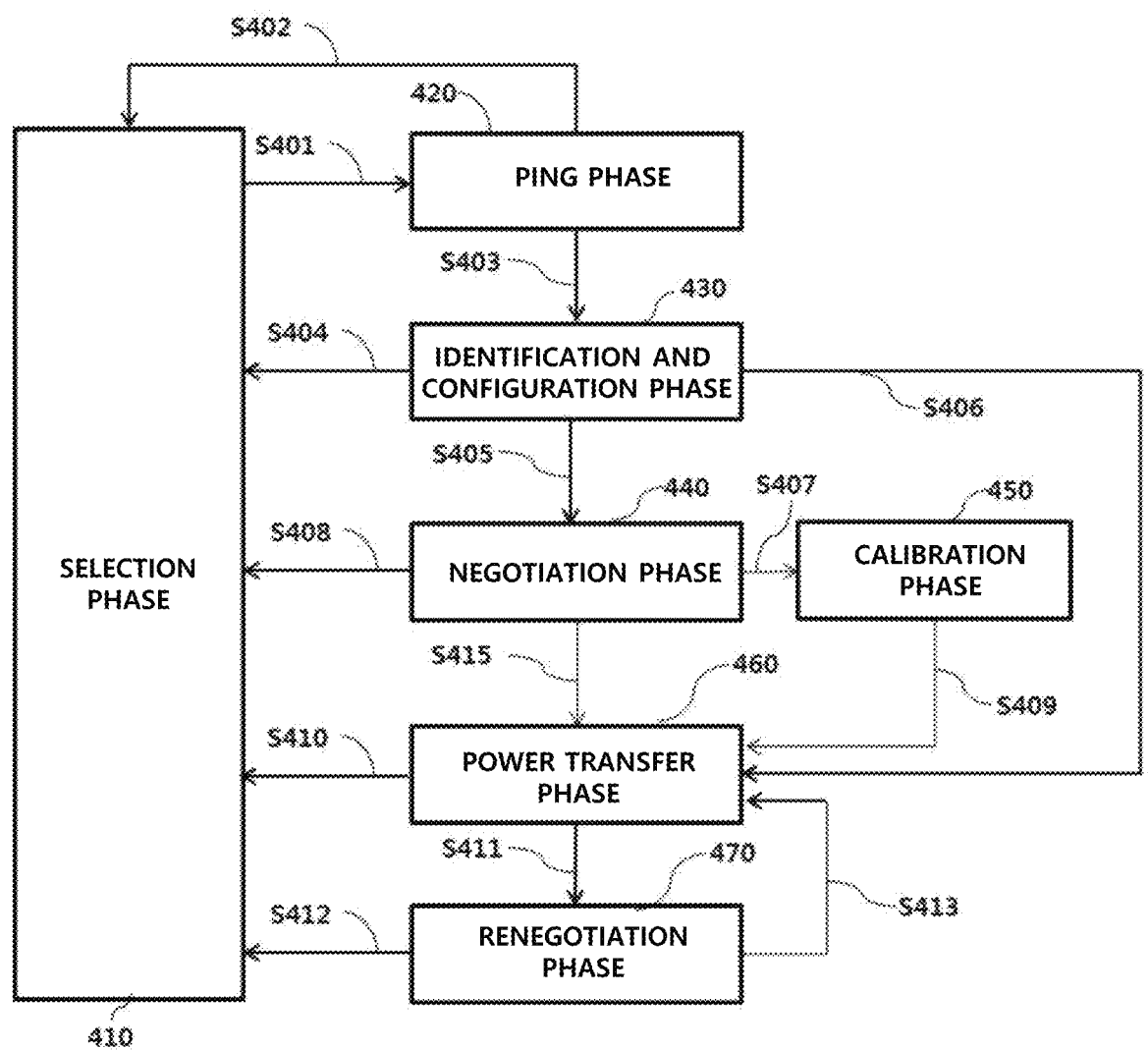
FIG. 4 is a state transition diagram for explanation of a wireless power transmission procedure according to an embodiment.

FIG. 4 is a state transition diagram for explanation of a wireless power transmission procedure according to an embodiment.

Referring to FIG. 4, power transmission to a receiver from a transmitter according to an embodiment may be broadly classified into a selection phase 410, a ping phase 420, an identification and configuration phase 430, a negotiation phase 440, a calibration phase 450, a power transfer phase 460, and a renegotiation phase 470.

The selection phase 410 may be a phase including—for example, S402, S404, S408, S410, and S412—which transitions when a specific error or a specific event is detected while power transmissions is started or power transmission is maintained.

Here, the specific error and the specific event would be obvious from the following description.

In addition, in the selection phase 410, the transmitter may monitor whether an object is present on an interface surface.

Upon detecting that the object is present on the interface surface, the transmitter may transition to the ping phase 420 (S403).

For example, in the selection phase 410, the transmitter may transmit an analog ping signal with a very short pulse and may detect whether an object is present in an active area of the interface surface based on a current change of a transmission coil (or a primary coil). Here, the active area may refer to an area in which a receiver is disposed to enable wireless charging.

In another example, in the selection phase 410, the transmitter may detect whether an object is present in an active area of an interface surface using a configured sensor.

For example, the sensor may include a hall sensor, a pressure sensor, a capacity sensor, a current sensor, a voltage sensor, a light detection sensor, and the like, and thereamong, the sensor may detect an object present in an active area through at least one sensor.

In the selection phase 410, upon detecting an object, the wireless power transmitter may measure a quality factor corresponding to a configured LC resonance circuit—for example, an LC resonant circuit including a coil (inductor) and a resonant capacitor that are connected in series to each other.

Upon detecting an object in the selection phase 410, the transmitter according to an embodiment may measure a quality factor value in order to determine whether a wireless power receiver along with a foreign object (FO) is present in a charging area. Here, the quality factor value may be measured prior to entrance into the ping phase 420. The quality factor value may be measured in the state in which power transmission through a transmission coil is temporally stopped.

For example, the quality factor value may be measured with respect to a predefined reference operation frequency.

In another example, the quality factor value may also be measured via sampling in units of predetermined frequencies in an operation frequency band used in wireless power transmission.

The transmitter according to an embodiment may check a frequency value corresponding to a quality factor value with a maximum value among quality factor values measured in the same frequency band and may store the frequency value in a memory. Hereinafter, for convenience of description, a frequency at which a quality factor value in the same operation frequency band is highest is referred to as a quality factor peak frequency or is simply referred to as a peak frequency for convenience of description.

Distribution of the quality factor value measured to correspond to the operation frequency band and the quality factor peak frequency may be different depending on a type of a wireless power transmitter.

In particular, a quality factor value measured using a transmitter—hereinafter, a 'transmitter for authentication' for convenience of description—and an LCR meter used to authenticate a receiver with respect to the same operation frequency may be different from a quality factor value measured by a commercially available transmitter.

Upon receiving a signal strength packet, the wireless power transmitter may enter the identification and configuration phase 430 (S403).

When the identification and configuration phase is normally completed, the wireless power transmitter may enter the negotiation phase 440 (S405).

When the identification and configuration phase is normally completed, the wireless power transmitter may also enter the power transfer phase 460 depending on a type of a receiver (S406).

When the wireless power transmitter enters the negotiation phase 440, the wireless power transmitter may receive an FOD status packet including a reference quality factor value from the wireless power receiver.

The wireless power transmitter may determine a quality factor threshold value based on the received reference quality factor value.

Then, the wireless power transmitter may compare the measured quality factor value and the quality factor threshold value to determine whether a foreign object is present.

However, when a foreign object detection method of simply comparing a predetermined quality factor threshold value determined based on the reference quality factor value and a measured quality factor value to detect whether a foreign object is present is applied to a commercially available transmitter, the accuracy of detecting a foreign object may be lowered.

Here, the reference quality factor value may refer to a quality factor value at a reference operation frequency measured in the state in which a foreign object is not present in a charging region of a transmitter for authentication.

The reference quality factor value received by the negotiation phase 440 and a quality factor value—hereinafter, a 'current quality factor' for convenience of description—corresponding to a reference operation frequency measured prior to the ping phase 420 may be compared with each other to determine whether a foreign object is present.

However, a transmitter that measures the reference quality factor value—i.e., a transmitter for authentication—and a transmitter that measures the current quality factor value may be different from each other. Accordingly, the quality factor threshold value determined to determine whether a foreign object is present may not be accurate.

Accordingly, the transmitter according to an embodiment may receive a reference quality factor value corresponding to a type of the corresponding transmitter from a wireless power receiver and may also determine the quality factor threshold value based on the received reference quality factor value.

A transmission coil may have the inductance and/or series resistance component in the transmission coil which may decrease due to environmental change, thereby changing (shifting) the resonant frequency of the corresponding transmission coil. That is, a quality factor peak frequency as a frequency at which the maximum quality factor value is measured in the operating frequency band may be shifted.

For example, since the wireless power receiver includes a magnetic shield (shielding material) having high permeability, the high permeability may increase the inductance value measured in the transmission coil. In contrast, a foreign object, which is a metallic material, decreases the inductance value.

Generally, in the case of an LC resonant circuit, the resonant frequency f resonant is calculated by $1/2\pi\sqrt{LC}$.

When only the wireless power receiver is placed in the charging area of the transmitter, the L value increases, and thus the resonant frequency decreases. That is, the resonant frequency is moved (shifted) to the left on the frequency axis.

In contrast, when a foreign object is placed in the charging area of the transmitter, the L value decreases, and thus the resonant frequency increases. That is, the resonant frequency is moved (shifted) to the right on the frequency axis.

The transmitter according to another embodiment may determine whether the foreign object placed in the charging area is present based on a change in the quality factor peak frequency.

The transmitter may acquire information on a preset quality factor peak frequency—hereinafter, a 'reference quality factor peak frequency pf_reference' or 'reference peak frequency' for convenience of description—corresponding to the corresponding transmitter type from the receiver or may maintain the information in a predetermined recording region.

Upon detecting that an objecting is placed in the charging area, the transmitter may measure a quality factor value in the operation frequency band prior to entrance into the ping phase 420 and may identify the quality factor peak frequency based on the measured result. Here, in order to distinguish the identified quality factor peak frequency from the reference quality factor peak frequency, the quality factor peak frequency may be referred to as a 'measured quality factor peak frequency pf_measured' or 'measured peak frequency'.

In the negotiation phase 440, the transmitter may determine whether the foreign object is present based on the reference quality factor peak frequency and the measured quality factor peak frequency.

When information on the reference quality factor peak frequency is received from the receiver, the information may be received through a predetermined packet in the identification and configuration phase 430 or the negotiation phase 440.

For example, the transmitter may transmit information on the transmission type thereof to the receiver in the identification and configuration phase 430. The receiver may read a pre-stored reference quality factor peak frequency corresponding to the received transmitter type information from a corresponding memory and may transmit information on the read reference quality factor peak frequency to the transmitter.

The transmitter according to another embodiment may determine whether the foreign object is present using both a foreign object detection method based on the quality factor peak frequency and a foreign object detection method based on the quality factor value.

For example, If a difference between the reference quality factor value corresponding to a transmitter type and the measured quality factor is small, for example, if the difference is equal to or less than 10%, presence of the foreign object may be determined by comparing the reference peak frequency corresponding to the transmitter type with the measured quality factor peak frequency.

In contrast, if the difference between the two quality factor values is greater than 10%, the transmitter may immediately determine that the foreign object is present.

According to another embodiment, upon determining that the quality factor threshold value determined based on the reference quality factor value corresponding to the transmitter type with the measured quality factor, the transmitter may also compare the reference quality factor peak frequency corresponding to the transmitter type with the measured quality factor peak frequency to determine whether the foreign object is present.

If it is difficult to detect the foreign object using the quality factor value, the transmitter may make a request to the identified receiver for information on the reference quality factor peak frequency corresponding to the corresponding transmitter type. Then, upon receiving information on the reference quality factor peak frequency from the receiver, the transmitter may determine whether the foreign object is present using the reference quality factor peak frequency and the measured quality factor peak frequency. As such, the transmitter may more accurately detect the foreign object placed in the charging area.

When the object is detected, the transmitter may enter the ping phase 420, may wake up the receiver, and may transmit a digital ping for identifying whether the detected object is a wireless power receiver.

In the ping phase 420, when a response signal to the digital ping, for example, a signal strength packet s not received from the receiver, the transmitter may transition to the selection phase 410 again.

In the ping phase 420, when a signal indicating that power transfer has been completed, that is, an end charging packet, is received from the receiver, the transmitter may transition to the selection phase 410.

When the ping phase 420 is completed, the transmitter may transition to the identification and configuration phase 430 for identifying the receiver and collecting the configuration and status information of the receiver.

In the identification and configuration phase 430, the transmitter may also transmit information on a transmitter type to the receiver.

In the identification and configuration phase 430, the receiver may make a request to the transmitter for information on the transmitter type, and the transmitter may also transmit the information on the transmitter type to the receiver according to the request of the receiver.

In the identification and configuration phase 430, when an unexpected packet is received, when an expected packet is not received during a predetermined time (timeout), when a packet transmission error occurs, or when power transfer contract is not established (no power transfer contract), the transmitter may transition to the selection phase 410.

The transmitter may determine whether entry into the negotiation phase 440 is necessary based on the negotiation field value of the configuration packet received in the identification and configuration phase 430.

As the check result, when negotiation is required, the transmitter may enter the negotiation phase 440 to perform a predetermined FOD procedure.

In contrast, as the check result, when negotiation is not required, the transmitter may immediately transition to the power transfer phase 460.

Upon checking that the corresponding wireless power receiver in the identification and configuration phase 430 is a receiver supporting only a first power transmission mode, the wireless power transmitter according to an embodiment may not perform the negotiation phase 440 and may immediately enter the power transfer phase 460.

The wireless power transmitter may enter the power transfer phase 460 and then may periodically perform a predetermined foreign object detection procedure. Here, the foreign object detection procedure may be a foreign object detection procedure based on the quality factor value without being limited thereto, and a foreign object detection procedure based on power loss may be applied.

A foreign object detection procedure based on power loss is a method of comparing a difference between transmission power of the wireless power transmitter and reception power of the wireless power receiver with a predetermined reference to determine whether the foreign object is present and a detailed procedure will be more obvious with reference to the following description of the drawings.

For example, in the negotiation phase 440, the transmitter may receive a FOD status packet including a reference quality factor value. In addition, the transmitter may receive the FOD status packet including a reference peak frequency value corresponding to the transmitter type.

In another example, in the negotiation phase 440, the transmitter may also receive a status packet including a reference quality factor value corresponding to the transmitter type and the reference peak frequency value. In this case, the transmitter may determine a quality factor threshold value for foreign object detection based on the reference quality factor value corresponding to the transmitter type.

The transmitter may also determine a quality factor peak frequency threshold value for foreign object detection based on the reference quality factor peak frequency value corresponding to the transmitter type. The transmitter may compare the determined quality factor threshold value and(or) the determined quality factor peak frequency threshold value with the measured quality factor value—which indicates a quality factor value measured prior to the ping phase 420—and(or) a measured quality factor peak frequency value to detect a foreign object placed in the charging area.

The transmitter may control power transmission according to the foreign object detection result. For example, when the foreign object is detected, the transmitter may transmit a negative acknowledge packet (NACK) to the receiver in response to the FOD status packet. Accordingly, power transmission may be stopped without being limited thereto.

The transmitter may compare the determined quality factor peak frequency threshold value and the measured quality factor peak frequency value to detect the foreign object placed in the charging area. The transmitter may control power transmission according to the foreign object detection result. For example, when the foreign object is detected, the transmitter may transmit a negative acknowledge packet (NACK) to the receiver in response to a FOD status packet. Accordingly, power transmission may be stopped without being limited thereto.

When the foreign object is detected, the transmitter may receive an end of charge message from the receiver and may enter the selection phase 410 based on the end of charge message.

When the foreign object is detected in the negotiation phase 440, the transmitter according to another embodiment may enter the power transfer phase 460 (S415).

In contrast, when the foreign object is not detected, the transmitter may complete the negotiation phase 440 with respect to transmission power and may enter the power transfer phase 460 through the calibration phase 450 (S407 and S409).

In detail, when the foreign object is not detected, the transmitter may determine the strength of the power received by a reception end in the calibration phase 450 and may measure power loss between a transmission end and a reception end in order to determine the intensity of power to be transmitted from the transmission end. That is, the transmitter may predict (or calculate) based on an intensity difference between transmission power at a transmission end and reception power at a reception end in the calibration phase 450.

In the power transfer phase 460, when an unexpected packet is received, when an expected packet is not received during a predetermined time (timeout), when predetermined power transfer contract violation occurs, or when charging is completed, the transmitter may transition to the selection phase 410 (S410).

In addition, in the power transfer phase 460, when the power transfer contract needs to be reconfigured according to transmitter state change, the transmitter may transition to the renegotiation phase 470 (S411). In this case, when renegotiation is normally completed, the transmitter may return to the power transfer phase 460 (S413).

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power, etc.

Figure 5:
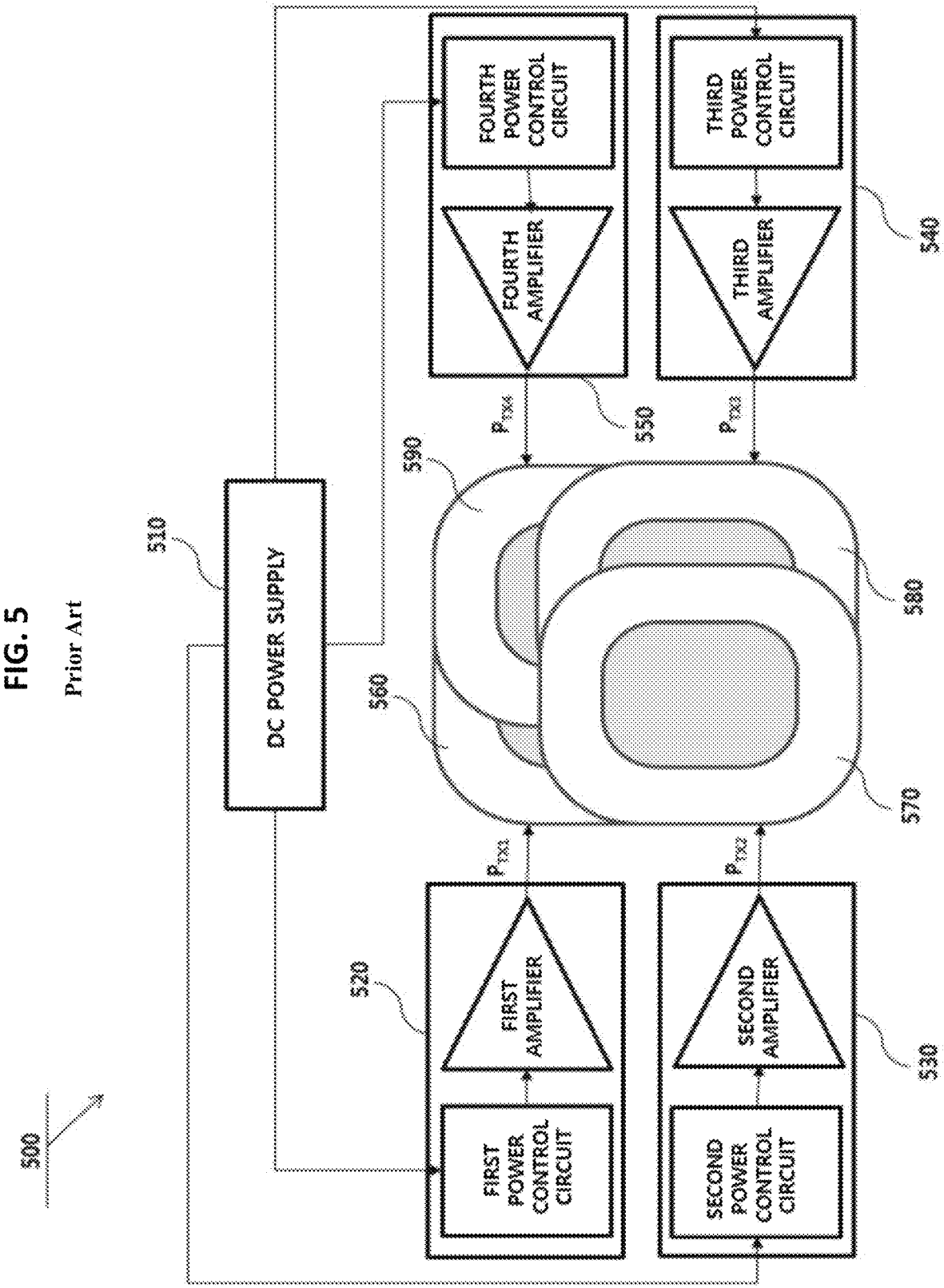
FIG. 5 is a diagram for explaining a conventional wireless power control method of a wireless power transmitter including four transmission coils.

FIG. 5 is a diagram for explaining a conventional wireless power control method of a wireless power transmitter including four transmission coils.

Referring to FIG. 5, a wireless power transmitter 500 may include a power supply 510, first to fourth transmission circuits 520 to 550 configured to receive power from the power supply 510 and to generate an alternating current (AC) power signal, and first to fourth transmission coils 560 to 590 configured to receive an AC power signal from the first to fourth transmission circuits 520 to 550 and to wirelessly output the AC power signal. Here, each transmission signal may include a power control circuit and an amplifier.

In the conventional wireless power transmitter 500, each transmission circuit may control at least one of an operation voltage, an operation frequency, or a duty rate of a pulse width modulation signal for generating an AC power signal to control the intensity of power supplied to a corresponding transmission coil.

Here, total power $P_{TOTAL}$ output through the four transmission coils included in the wireless power transmitter 500 may be equal to the sum of first power $P_{TX1}$, second power $P_{TX2}$, third power $P_{TX3}$, and fourth power $P_{TX4}$.

Figure 6:
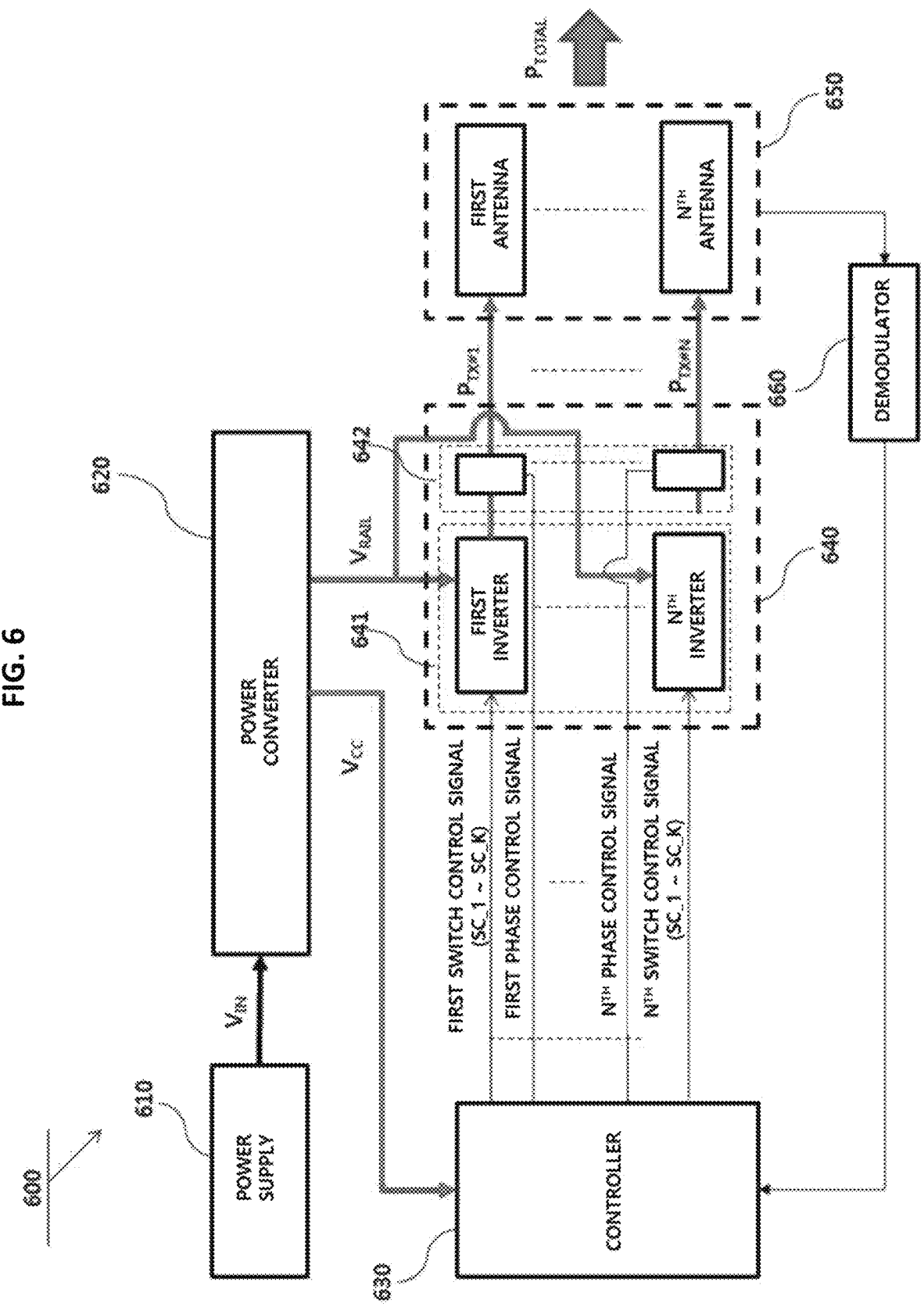
FIG. 6 is a block diagram for explaining the configuration of a wireless power transmission apparatus according to an embodiment.

FIG. 6 is a block diagram for explaining the configuration of a wireless power transmission apparatus according to an embodiment.

Referring to FIG. 6, a wireless power transmission apparatus 600 may include a power supply 610, a power converter 620, a controller 630, an AC power generator 640, a transmission antenna 650, and a demodulator 660. Here, the transmission antenna 650 may include first to $N^{th}$ antennas. Each antenna may include an LC resonance circuit including a capacitor C and an inductor L that are connected in series to each other.

The power converter 620 may convert a voltage $V_{IN}$ applied from the power supply 610 into direct current (DC) voltage. Here, $V_{IN}$ may be DC voltage, but this is merely an embodiment, and according to another embodiment, $V_{IN}$ may be AC voltage.

When $V_{IN}$ is AC voltage, the power converter 620 may include a rectifier circuit. The power converter 620 may rectify the AC voltage $V_{IN}$ and may convert the rectified voltage into specific DC voltage.

The power converter 620 may generate DC voltage $V_{CC}$ required for an operation of the controller 630.

The power converter 620 may generate DC voltage $V_{RAIL}$ required to drive the AC power generator 640.

The AC power generator 640 may include first to $N^{th}$ inverters 641 and first to $N^{th}$ phase control circuits 642 for adjusting phases of output signals of corresponding inverters. Here, any one may be selected from conventional various phase control circuit design methods and may be applied to a detailed circuit configuration of a phase control circuit, and thus a description of the detailed circuit configuration will be omitted.

All driving voltages applied to the first to $N^{th}$ inverters 641 may be the same as $V_{RAIL}$.

The controller 630 may generate first to $N^{th}$ switch control signals for controlling switches included in the first to $N^{th}$ inverters 641 and may apply the generated signals to the respective inverters. Here, each of the first to $N^{th}$ switch control signals may include a plurality of pulse width modulation signals having a predetermined duty, and the number of the pulse width modulation signals applied to each inverter may be equal to the number of switches included in the corresponding inverter.

For example, when the number of switches included in an inverter is K, the number of pulse width modulation signals applied to an inverter may be K. Here, K may be, but is not limited to, 2 or 4. When K is 2, a corresponding inverter may be of a half-bridge type, and when K is 4, the corresponding inverter may be of a full-bridge type.

The first to $N^{th}$ switch control signals according to the embodiment may be the same.

Inverters included in the AC power generator 640 may have the same type structure.

When an inverter is of a full-bridge type, the controller 630 may also control the inverter to operate in a half-bridge mode using a switch control signal.

Phases of corresponding output signals of the first to $N^{th}$ inverters 641 may be adjusted by the first to $N^{th}$ phase control circuits 642, respectively.

AC power signals, the phases of which are adjusted, may be output to corresponding antennas, respectively.

The total power $P_{TOTAL}$ output through N antennas may be equal to the sum of first power $P_{TX\#1}$ to $N^{th}$ power $P_{TX\#N}$.

The controller 630 may generate first to $N^{th}$ phase control signals and may control operations of the first to $N^{th}$ phase control circuits 642.

The controller 630 may receive a control packet of a wireless power receiver through the demodulator 660. Here, the control packet may include information on required power of the wireless power receiver.

The demodulator 660 may demodulate a signal on the transmission antenna 650, the amplitude of which is modulated, and may transfer the demodulated packet to the controller 630.

The controller 630 may generate the first to $N^{th}$ phase control signals based on the required power of the wireless power receiver.

The controller 630 may fix an operation voltage applied to the AC power generator 640, an operation frequency, and a duty rate of a pulse width modulation signal applied to an inverter and may then control total transmission power $P_{TOTAL}$ output through the transmission antenna 650 using the first to $N^{th}$ phase control signals.

For example, the controller 630 may control a duty rate of a pulse width modulation signal to maintain N AC power signals, which are applied to the first to $N^{th}$ antennas, respectively, in a duty of 50% or greater.

For example, the controller 630 may fix a frequency of a pulse width modulation signal and may fix an operation frequency.

The controller 630 may determine the first to $N^{th}$ phase control signals to make the total transmission power $P_{TOTAL}$ converge on the required power of the wireless power receiver.

The controller 630 according to the present embodiment may change phases of some of output signals of the first to $N^{th}$ inverters and may control the total transmission power $P_{TOTAL}$.

For example, when the AC power generator 640 includes four inverters, the controller 630 may not perform phase control on output signals of the first and second inverters but instead may perform phase control only on output signals of the third and fourth inverters and may control the total transmission power $P_{TOTAL}$.

In another example, when the AC power generator 640 includes four inverters, the controller 630 may control the total transmission power $P_{TOTAL}$ by performing control to make phases of the output signals of the first and second inverters be 0 degree and then dynamically changing only phases of the output signals of the third and fourth inverters without phase control on the output signals of the first and second inverters any longer.

In another example, when the AC power generator 640 includes four inverters, the controller 630 may control the total transmission power $P_{TOTAL}$ by controlling phases of output signals of the first and second inverters to equalize phases of the power signals applied to the first and second antennas and then dynamically changing phases of the power signals applied to the third to fourth antennas to be equal to each other based on the phases of the power signals applied to the first and second antennas.

According to the aforementioned embodiment shown in FIG. 6, the wireless power transmission apparatus including a plurality of antennas for wireless power transmission may advantageously precisely control the total transmission power through phase control of an AC power signal applied to each transmission coil.

According to the aforementioned embodiment shown in FIG. 6, the wireless power transmission apparatus may advantageously stably control power supply depending on various types of a wireless power reception apparatus and power required by the wireless power receiver.

According to the aforementioned embodiment shown in FIG. 6, in the wireless power transmission apparatus including a plurality of antennas for wireless power transmission, one controller may precisely control the total transmission power through simple phase control for each transmission coil without a power control circuit for each transmission coil included in the antennas, thereby lowering device complexity and reducing manufacturing costs.

Figure 7:
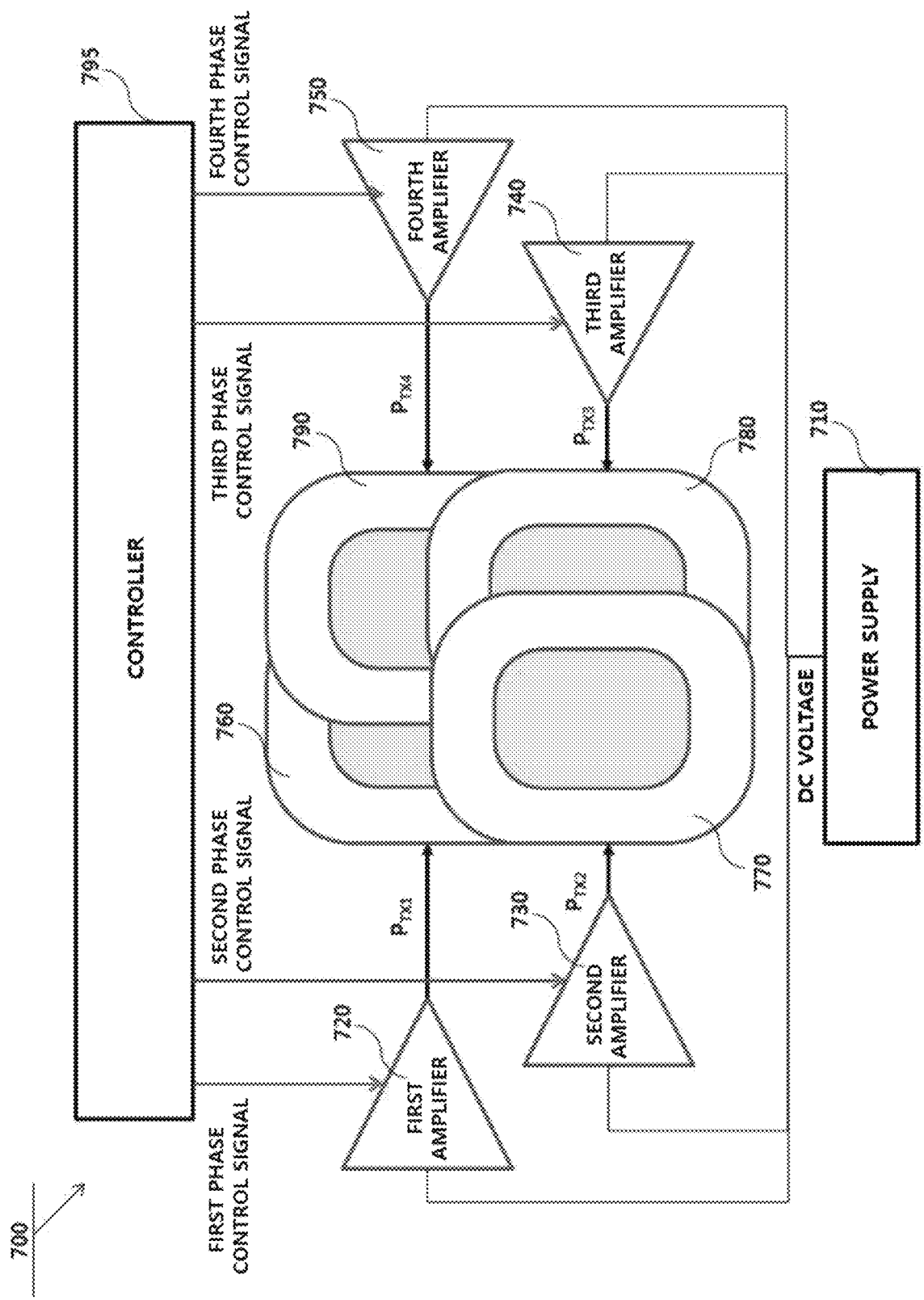
FIG. 7 is a diagram for explaining the configuration of a wireless power transmission apparatus according to another embodiment.

FIG. 7 is a diagram for explaining the configuration of a wireless power transmission apparatus according to another embodiment.

Referring to FIG. 7, a wireless power transmission apparatus 700 may include a power supply 710, a first amplifier 720, a second amplifier 730, a third amplifier 740, a fourth amplifier 750, a first transmission coil 760, a second transmission coil 770, a third transmission coil 780, a fourth transmission coil 790, and a controller 795.

The first to fourth amplifiers 720 to 750 may receive DC voltage of a predetermined intensity as driving voltage from the power supply 710 and may perform signal amplification. Here, the intensity of the DC voltage applied to the first to fourth amplifiers 720 to 750 may be maintained constant.

The controller 795 may control an output signal phase of the first to fourth amplifiers 720 to 750 using the first to fourth phase control signals.

In this case, the controller 795 may fix the operation frequency of the pulse width modulation signal applied to the first to fourth amplifiers 720 to 750 to a specific value and may also maintain a duty rate of the pulse width modulation signal in a specific value in order to generate the AC power signal.

The controller 795 may effectively and precisely control the total transmission power of the wireless power transmission apparatus 700 using only the first to fourth phase control signals without adjustment of the driving voltage, the operation frequency, and the duty rate.

Here, the total power $P_{TOTAL}$ output through the four transmission coils 760 to 790 included in the wireless power transmission apparatus 700 may be equal to the sum of the first power $P_{TX1}$, the second power $P_{TX2}$, the third power $P_{TX3}$, and the fourth power $P_{TX4}$.

Although the wireless power transmission apparatus 700 according to the aforementioned embodiment of FIG. 7 includes four transmission coils, this is merely an embodiment, and thus greater or fewer transmission coils may alternatively be implemented.

A plurality of transmission coils according to an embodiment may partially overlap each other as shown in FIG. 7 above.

In the wireless power transmission apparatus including a plurality of transmission coils for wireless power transmission according to the aforementioned embodiment of FIG. 7, total transmission power may be advantageously precisely controlled only through phase control of an AC power signal applied to each transmission coil.

According to the aforementioned embodiment shown in FIG. 7, the wireless power transmission apparatus may advantageously stably control power supply depending on various types of a wireless power reception apparatus and required power.

According to the aforementioned embodiment shown in FIG. 7, in the wireless power transmission apparatus including a plurality of transmission coils may advantageously precisely control the total transmission power through one controller without a power control circuit for each transmission coil, thereby lowering device complexity and reducing manufacturing costs.

Figure 8:
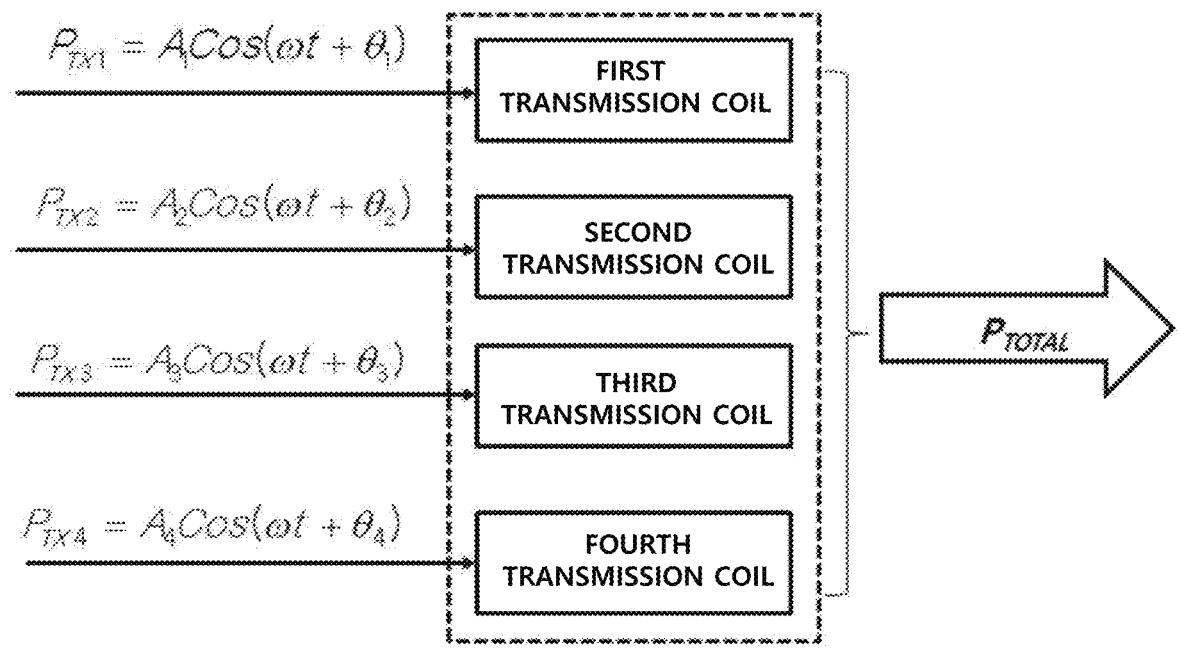
FIG. 8 is a diagram for explaining a wireless power control method through phase control of a wireless power transmission apparatus according to an embodiment.

FIG. 8 is a diagram for explaining a wireless power control method through phase control of a wireless power transmission apparatus according to an embodiment.

According to the following embodiment, an example in which a wireless power transmission apparatus includes four transmission coils will be described. Here, power applied to the first to fourth transmission coils will be referred to as first power $P_{TX1}$, second power $P_{TX2}$, third power $P_{TX3}$, and fourth power $P_{TX4}$, respectively.

In this case, the first power $P_{TX1}$, the second power $P_{TX2}$, the third power $P_{TX3}$, and the fourth power $P_{TX4}$ may be represented as $A_1\cos(\omega t+\theta_1)$, $A_2\cos(\omega t+\theta_2)$, $A_3\cos(\omega t+\theta_3)$, and $A_4\cos(\omega t+\theta_4)$, respectively. Here, A may be an amplitude of a corresponding power signal, $\omega$ is an operation frequency, and $\theta$ is a phase of the corresponding power signal.

The total transmission power $P_{TOTAL}$ may be represented using Equation 1 below.

$$P_{TOTAL}=P_{TX1}+P_{TX2}+P_{TX3}+P_{TX4}=A_1\cos(\omega t+\theta_1)+A_2\cos(\omega t+\theta_2)+A_3\cos(\omega t+\theta_3)+A_4\cos(\omega t+\theta_4) \quad \text{<Equation 1>}$$

When $A_1=A_2=A_3=A_4=1$ and $\theta_1=\theta_2=\theta_3=\theta_4$, $P_{TOTAL}$ may be represented using Equation 2 below.

$$P_{TOTAL} = \qquad \text{(Equation 2)}$$
$$2(\cos(\omega t) + \cos(\omega t + \theta_3)) = 4\cos\left(\omega t + \frac{\theta_3}{2}\right)\cos\left(\frac{\theta_3}{2}\right)$$

In this case, the maximum amplitude of $P_{TOTAL}$ is $$4\cos\left(\frac{\theta_3}{2}\right)$$

and the phase is $$\frac{\theta_3}{2}.$$

Figure 9:
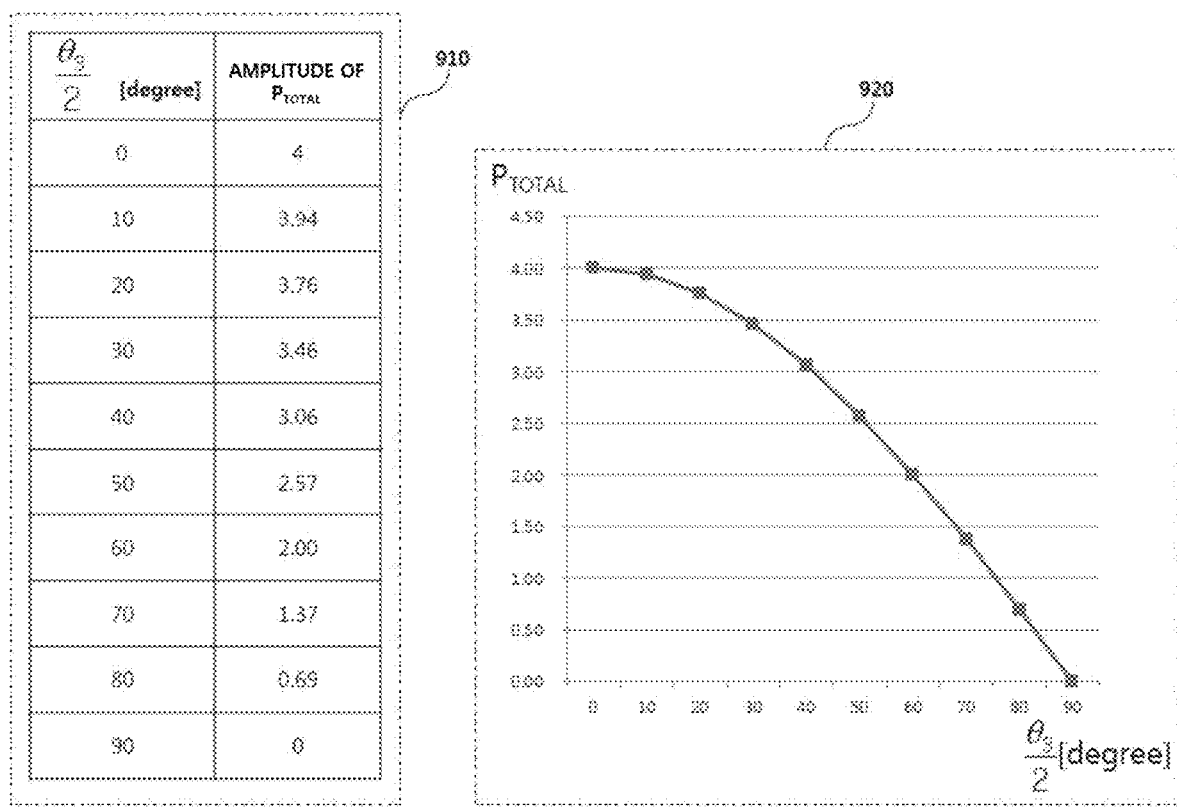
FIG. 9 shows a change in $P_{TOTAL}$ depending on a change in $\theta_3$ in the embodiment of FIG. 8.

FIG. 9 shows a change in $P_{TOTAL}$ depending on a change in $\theta_3$ in the embodiment of FIG. 8.

Referring to reference numerals 910 to 920, when is $$\frac{\theta_3}{2}$$

is 0, $P_{TOTAL}$ is 4 as the maximum, as $\theta_3$ increases, $P_{TOTAL}$ may decrease, and accordingly, when $$\frac{\theta_3}{2}$$

is 90, $P_{TOTAL}$ is 0 as the minimum.

As described above with reference to FIGS. 8 and 9, the wireless power transmission apparatus according to the embodiment may precisely adjust the total transmission power between 0% and 100% by dynamically changing phases of power signals applied to transmission coils 3 and 4 in the state in which phases of power signals applied to transmission coils 1 and 2 are maintained constant.

The wireless power transmission apparatus according to the present embodiment may perform control to make phases of the power signals applied to the transmission coils 3 and 4 be the same.

Figure 10:
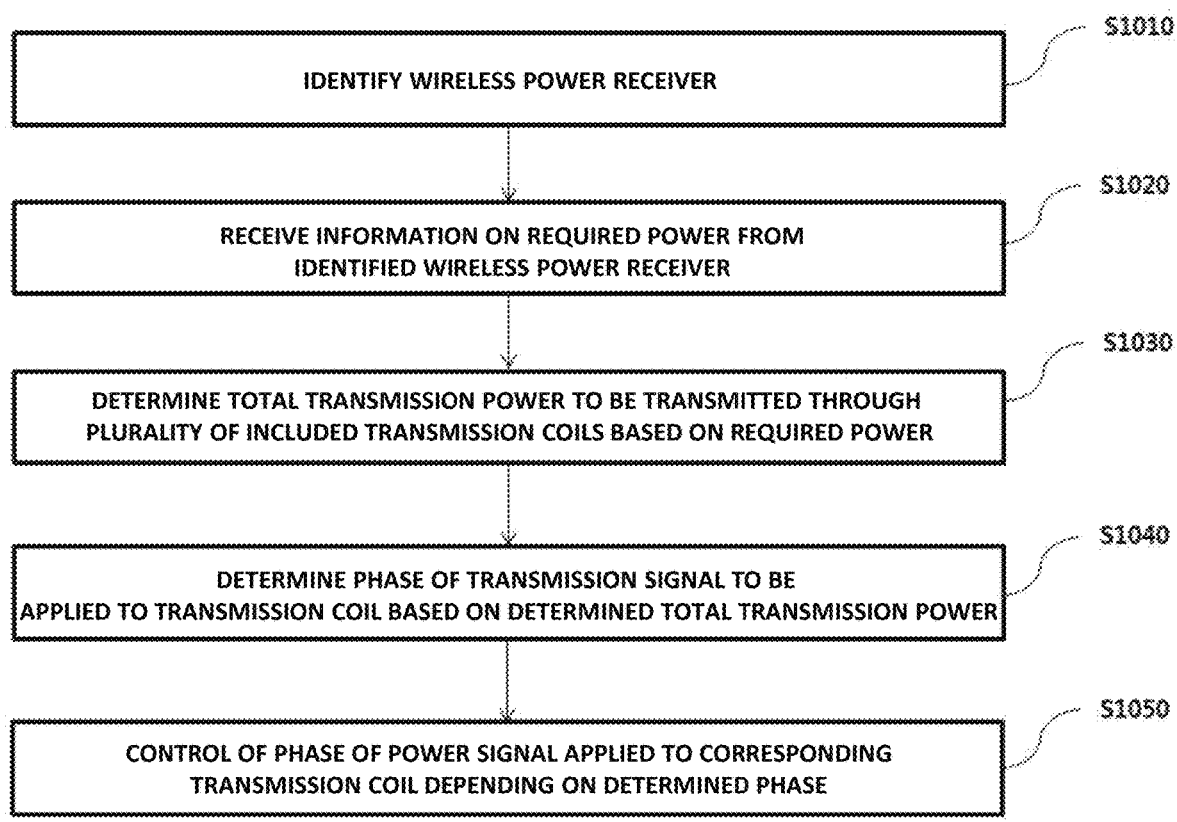
FIG. 10 is a flowchart for explaining a wireless power control method of a wireless power transmission apparatus including a plurality of transmission coils according to an embodiment.

FIG. 10 is a flowchart for explaining a wireless power control method of a wireless power transmission apparatus including a plurality of transmission coils according to an embodiment.

Referring to FIG. 10, a wireless power transmitter may identify a wireless power receiver (S1010).

The wireless power transmitter may receive information on required power from the identified wireless power receiver (S1020).

The wireless power transmitter may determine total transmission power to be transmitted through the plurality of included transmission coil based on at least the required power (S1030).

The wireless power transmitter may determine a phase of a power signal to be applied to each transmission coil based on the determined total transmission power (S1040).

The wireless power transmitter may control a phase of a power signal applied to a corresponding transmission coil depending on the determined phase (S1050).

The wireless power transmitter may transmit information on available power of the wireless power transmitter to the identified wireless power receiver. In this case, the wireless power receiver may determine required power within the available power and may transmit information on the determined required power to the wireless power transmitter.

The wireless power transmitter may change phases of some of power signals applied to the transmission coil and may control the total transmission power $P_{TOTAL}$.

For example, when the wireless power transmitter includes four inverters (or amplifiers), the wireless power transmitter may control the total transmission power $P_{TOTAL}$ by performing phase control only on output signals of the third and fourth inverters (or amplifiers) rather than performing phase control on output signals of the first and second inverters (or amplifiers).

In another example, when the wireless power transmitter includes four inverters (or amplifiers), the wireless power transmitter may control the total transmission power $P_{TOTAL}$ by performing control to make phases of the output signals of the first and second inverters (or amplifiers) be 0 degrees and then dynamically changing only phases of the output signals of the third and fourth inverters (or amplifiers) without phase control on the output signals of the first and second inverters (or amplifiers) any longer.

In another example, when the wireless power transmitter includes four inverters, the wireless power transmitter may control the total transmission power $P_{TOTAL}$ by controlling phases of output signals of the first and second inverters (or amplifiers) to equalize phases of the power signals applied to the first and second antennas (or transmission coils) and then dynamically changing phases of the power signals applied to the third to fourth antennas (or transmission coils) to be equal to each other based on the phases of the power signals applied to the first and second antennas (or transmission coils).

The wireless power transmitter may control the total transmission power by fixing phases of at least two AC power signals among the plurality of AC power signals and varying phases of at least two different AC power signals among the plurality of AC power signals.

The wireless power transmitter may include a plurality of inverters corresponding to the number of the plurality of transmission coils and may maintain driving voltages applied to the plurality of inverters to be equal to each other.

The wireless power transmitter may generate an AC power signal based on driving voltage and a plurality of pulse width modulation signals for controlling a plurality of switches included in the inverter.

The wireless power transmitter may control a duty rate of a pulse width modulation signal to maintain a plurality of AC power signals in a duty of 50% or greater.

The wireless power transmitter may also control a frequency of the pulse width modulation signal to fix an operation frequency.

The wireless power transmitter may include a plurality of phase control circuits for controlling respective phases of a plurality of AC power signals, and may control the total transmission power by controlling a plurality of phase control circuits depending on the determined phase.

According to the aforementioned embodiment shown in FIG. 10, the wireless power transmission apparatus including a plurality of antennas for wireless power transmission may advantageously precisely control the total transmission power through phase control of an AC power signal applied to each transmission coil.

According to the aforementioned embodiment shown in FIG. 10, the wireless power transmission apparatus may advantageously stably control power supply depending on various types of a wireless power reception apparatus and power required by the wireless power receiver.

According to the aforementioned embodiment shown in FIG. 10, a wireless power transmission method of the wireless power transmission apparatus including a plurality of transmission coils may precisely control total transmission power through simple phase control for each transmission coil without a power control circuit for each included transmission coil, thereby lowering device complexity and reducing manufacturing costs.

As described above, although embodiments have been described with reference to the accompanying drawings, it would be understood that those of ordinary skill in the art to which the present disclosure pertains may implement the embodiments in other specific forms without changing the technical spirit or essential features of the embodiments. Therefore, the aforementioned embodiments are illustrative and non-limiting in all respects.

The embodiments may be applied to a wireless power transmission apparatus including a plurality of transmission coils.

The invention claimed is:

1. A wireless power transmitter comprising:
a controller;
at least first, second, third and fourth transmission coils; and
an alternating current (AC) power generator including:
at least first, second, third and fourth inverters directly connected to the controller and configured to receive first, second, third and fourth switch control signals output by the controller to control the first, second, third and fourth inverters to convert an applied direct current (DC) power into first, second, third and fourth AC power signals, respectively; and
at least first, second, third and fourth phase control circuits directly connected between an output of the first, second, third and fourth inverters and an input of the first, second, third and fourth transmission coils, respectively, and configured to adjust phases of the first, second, third and fourth AC power signals based on first, second, third and fourth input phase control signals output by the controller, respectively,
wherein each of the first, second, third and fourth inverters receives a same DC power output by a power converter directly connected to the AC power generator,
wherein each of the first, second, third and fourth switch control signals is the same, and
wherein the controller is configured to:
in response to receiving a first request requesting a first wireless power from a wireless power receiver, output the first, second, third and fourth switch control signals being the same, and output the first, second, third and fourth phase control signals to change phases of the first, second, third and fourth AC power signals to deliver the requested first wireless power,
in response to receiving a second request requesting a second wireless power from the wireless power receiver that is greater than the first wireless power, output the first, second, third and fourth switch control signals being the same to control amplitudes of the first, second, third and fourth AC power signals to be equal to each other, and output the first, second, third and fourth phase control signals to decrease phases of the third and fourth AC power signals a same amount without increasing or decreasing phases of the first and second AC power signals to increase a total power level of power output through the plurality of transmission coils and to deliver the requested second wireless power, and
in response to receiving a third request requesting a third wireless power from the wireless power receiver that is less than the first wireless power, output the first, second, third and fourth switch control signals being the same to control amplitudes of the first, second, third and fourth AC power signals to be equal to each other, and output the first, second, third and fourth phase control signals to increase phases of the third and fourth AC power signals a same amount without increasing or decreasing phases of the first and second AC power signals to decrease the total power level of the power output through the plurality of transmission coils and to deliver the requested third wireless power.

2. The wireless power transmitter of claim 1, wherein the power converter is configured to rectify received AC power and to supply the DC power to the AC power generator and the controller.

3. The wireless power transmitter of claim 1, wherein the first switch control signal includes K number of pulse width modulation signals for controlling K number of switches included in the first inverter,
wherein the second switch control signal includes K number of pulse width modulation signals for controlling K number of switches included in the second inverter,
wherein the third switch control signal includes K number of pulse width modulation signals for controlling K number of switches included in the third inverter, and
wherein the fourth switch control signal includes K number of pulse width modulation signals for controlling K number of switches included in the fourth inverter.

4. The wireless power transmitter of claim 3, wherein the controller controls a duty rate of the pulse width modulation signal to maintain the first, second, third and fourth AC power signals in a duty ratio of 50% or greater.

5. The wireless power transmitter of claim 3, wherein the controller fixes an operation frequency by controlling a frequency of the pulse width modulation signal.

6. The wireless power transmitter of claim 1, further comprising:
a demodulator configured to demodulate a control signal of the wireless power receiver,
wherein the controller controls the first, second, third and fourth phase control circuits by determining the transmission power based on a required power of the wireless power receiver, received from the demodulator, and generating the first, second, third and fourth phase control signals corresponding to the determined transmission power.

7. The wireless power transmitter of claim 1, further comprising:
at least first, second, third and fourth amplifiers configured to receive the DC voltage and to amplify signals being transmitted to the first, second, third and fourth transmission coils, respectively.

8. The wireless power transmitter of claim 7, wherein total power output from the first, second, third and fourth transmission coils is equal to a sum of output power of the first, second, third and fourth amplifiers.

9. The wireless power transmitter of claim 7, wherein the first, second, third and fourth transmission coils partially overlap each other.

10. The wireless power transmitter of claim 7, wherein an intensity of the DC voltage applied to the first, second, third and fourth amplifiers is maintained constant.

11. The wireless transmitter of claim 1, wherein the controller is further configured to:
in response to receiving a fourth request requesting a maximum amount of wireless power from the wireless power receiver, output the first, second, third and fourth switch control signals being the same to control the amplitudes of the first, second, third and fourth AC power signals to be 1, and control the first, second, third and fourth phase control signals to control the phases of the first, second, third and fourth AC power signals to be 0 degrees to deliver the requested maximum amount of wireless power.

12. The wireless transmitter of claim 11, wherein the controller is further configured to:
in response to receiving a fifth request requesting half of the maximum wireless power from the wireless power receiver, maintain the output of the first, second, third and fourth switch control signals being the same to control the amplitudes of the first, second, third and fourth AC power signals to be 1, output the first and second phase control signals to control the phases of the first and second AC power signals to be 0 degrees and output the third and fourth phase control signals to control the phases of the third and fourth AC power signals to be 120 degrees to deliver the requested half of the maximum wireless power.

13. A wireless power control method of a wireless power transmitter including a controller; at least first, second, third and fourth transmission coils; and an alternating current (AC) power generator including at least first, second, third and fourth inverters directly connected to the controller, and at least first, second, third and fourth phase control circuits directly connected between an output of the first, second, third and fourth inverters and an input of the first, second, third and fourth transmission coils, the method comprising:
outputting, by the controller, first, second, third and fourth switch control signals to the first, second, third and fourth inverters, respectively;
converting, by the first, second, third and fourth inverters, an applied direct current (DC) power into first, second, third and fourth AC power signals, respectively, according to the output first, second, third and fourth switch control signals;
outputting, by the controller, first, second, third and fourth phase control signals directly to the first, second, third and fourth phase control circuits;
adjusting, by the first, second, third and fourth phase control circuits, phases of the first, second, third and fourth AC power signals based on the first, second, third and fourth input phase control signals output by the controller, respectively, wherein each of the first, second, third and fourth inverters receives a same DC power output by a power converter directly connected to the AC power generator, and wherein each of the first, second, third and fourth switch control signals is the same;
identifying a wireless power receiver;
in response to receiving a first request requesting a first wireless power from the identified wireless power receiver, outputting, via the controller, the first, second, third and fourth switch control signals being the same, and outputting the first, second, third and fourth phase control signals to change phases of the first, second, third and fourth AC power signals to deliver the requested first wireless power;
in response to receiving a second request requesting a second wireless power from the wireless power receiver that is greater than the first wireless power, outputting, via the controller, the first, second, third and fourth switch control signals being the same to control amplitudes of the first, second, third and fourth AC power signals to be equal to each other, and outputting, via the controller, the first, second, third and fourth phase control signals to decrease phases of the third and fourth AC power signals a same amount without increasing or decreasing phases of the first and second AC power signals to increase a total power level of power output through the plurality of transmission coils and to deliver the requested second wireless power; and
in response to receiving a third request requesting a third wireless power from the wireless power receiver that is less than the first wireless power, outputting, via the controller, the first, second, third and fourth switch control signals being the same to control amplitudes of the first, second, third and fourth AC power signals to be equal to each other, and outputting, via the controller, the first, second, third and fourth phase control signals to increase phases of the third and fourth AC power signals a same amount without increasing or decreasing phases of the first and second AC power signals to decrease the total power level of the power output through the plurality of transmission coils and to deliver the requested third wireless power.

14. The method of claim 13, wherein the first switch control signal includes K number of pulse width modulation signals for controlling K number of switches included in the first inverter,
wherein the second switch control signal includes K number of pulse width modulation signals for controlling K number of switches included in the second inverter,
wherein the third switch control signal includes K number of pulse width modulation signals for controlling K number of switches included in the third inverter, and
wherein the fourth switch control signal includes K number of pulse width modulation signals for controlling K number of switches included in the fourth inverter.

* * * * *